United States Patent [19]

Kaehler et al.

[11] Patent Number: 5,515,496
[45] Date of Patent: May 7, 1996

[54] COMPUTER SYSTEM WITH DIRECT MANIPULATION INTERFACE AND METHOD OF OPERATING SAME

[75] Inventors: Edwin B. Kaehler, Palo Alto; Alan C. Kay, Los Angeles; Scott G. Wallace, Campbell, all of Calif.

[73] Assignee: Apple Computer, Inc., Cupertino, Calif.

[21] Appl. No.: 996,444

[22] Filed: Dec. 24, 1992

[51] Int. Cl.⁶ .................................................... G06F 3/14
[52] U.S. Cl. ........................ 395/159; 395/161; 395/155
[58] Field of Search ................................. 395/155, 161, 395/157, 158, 159, 160, 156, 146; 345/145, 146

[56] References Cited

U.S. PATENT DOCUMENTS

| | | | |
|---|---|---|---|
| 5,131,083 | 7/1992 | Crawford et al. | 395/275 |
| 5,140,677 | 8/1992 | Fleming et al. | 395/159 |
| 5,220,675 | 6/1993 | Padawer et al. | 395/155 X |
| 5,287,514 | 2/1994 | Gram | 395/155 X |
| 5,297,250 | 3/1994 | Leroy et al. | 395/157 |
| 5,325,481 | 6/1994 | Hunt | 395/159 |
| 5,335,320 | 8/1994 | Iwata et al. | 395/155 |
| 5,341,293 | 8/1994 | Vertelney et al. | 395/159 X |
| 5,396,590 | 3/1995 | Kreegar | 395/159 |

OTHER PUBLICATIONS

Deskset Environment Reference Guide, "Icon Editor", 1990, Sun Microsystems, Inc., pp. 189–202.
"The Use–Mention Perspective on Programming for the Interface", Randall B. Smith, David Ungar, and Bay–Wei Chang, Sun Labs, Sun Microsystems, Inc., Mountain View, CA, U.S., Submission to SIGCHI '91 Workshop on Computer Languages for Programming User Interface Software, pp. 1–8.

*Languages for Developing User Interfaces*, Edited by Brad A. Myers, School of Computer Science, Carnegie Mellon University, Pittsburgh, Pennsylvania, Jones and Bartlett Publishers, 1992, Boston, MA, U.S., London, England, pp. ix; 79, 89.

*Primary Examiner*—Raymond J. Bayerl
*Assistant Examiner*—Crescelle N. dela Torre
*Attorney, Agent, or Firm*—V. Randall Gard

[57] ABSTRACT

A computer system, including a display screen and a direct input device such as a mouse, with a direct manipulation interface, through which the user can not only cause the computer to perform a predefined task by selectively indicating a symbol representing the task but also edit such symbols and their attributes by causing handle-like figures to appear on the screen near the symbol to be edited. The system is operable in two modes. One is a use mode for having a predefined task carried out and no handle-like figures are shown. The other is an edit-and-use mode wherein the user can cause the handle-like figures to appear or disappear but can also carry out every task that can be carried out in the use mode regardless of whether or not these figures are being displayed.

20 Claims, 4 Drawing Sheets

COMPUTER SYSTEM WITH DIRECT
MANIPULATION INTERFACE AND
METHOD OF OPERATING SAME

FIELD OF THE INVENTION

This invention relates to a computer system with a direct manipulation computer user interface and methods of operating such a system. More particularly, this invention relates to the so-called use-mention problem related to such a system.

BACKGROUND OF THE INVENTION

Direct manipulation interfaces are popular because they allow computer users to import intuitions from their real world experience. Most standard programming languages, such as Fortran, are very different from everyday languages, such as English. Developers of computer user interfaces have recognized the advantages of taking the physical world metaphor seriously. HyperCard® (trademark of Apple Computer, Inc.), for example, allows the user not only to use the computer in the ordinary sense of the word (that is, by causing the computer to perform a predefined task such as accessing a database, file, stack, etc., stored in a memory) but also to modify its computer user interface by editing the pictorial images ("icons") and texts, which indicate action-initiating areas displayed on the screen, by causing the computer to perform an interface-modifying operation.

Action-initiating areas related to such predetermined tasks are often called a button or a menu item, depending upon how they appear and/or how they function. An action-initiating area can also be as simple as a line segment or a graphical element. In what follows, action-initiating areas of all shapes and designs may be comprehensively referred to as a "display object" or simply as an "object." In other words, a display object is whatever is displayed on the screen and is associated with a certain predefined task to be performed by the computer as explained above. The user can cause the computer to perform a desired task by selectively indicating on the screen a particular display object (such as a button or a textual menu item) associated with the desired task and sending an activating signal to the computer. For this purpose, a mouse may be used, which not only can move a position-indicating symbol (also known as a pointer) on the display screen but also can be "clicked" by depressing a switch (also known as a "button", albeit a physical one) on the mouse.

When a mouse is used to "press" a button display object, for example, to thereby cause the computer to perform the predefined task associated with the button, it may be said that the button has been "used." As mentioned above, however, a modern interface is adapted not only to be "used" in the sense of the word explained above, but also to allow the user to modify it by editing its attributes. When the user wants to modify attributes of a button, for example, the user is not necessarily wanting to "use" it so as to cause the computer to perform the predefined task associated with this button. Instead, the user merely wants to "mention" the button to the computer such that desired modifications of attributes ("editing") will be effected on the desired button (or that the computer will perform an interface-modifying operation). To "use" a button and to "mention" (or "edit") a button are basically different types of operations, and prior art programming made it troublesome to get back and forth between these two types or modes of operation. This has often been referred to as the use-mention (or use-edit) problem by the developers of interfaces and programs therefor.

In the modal approach of HyperCard®, as in most prior art systems, the user is required to decide whether functionalities of the interface are to be modified but not used or, instead, to be used but not modified. As shown schematically in FIG. 5 by way of a simplified event loop flowchart, the user is required to choose (or remain in) the use-only mode (called "Browse Mode") if functionalities of the interface are going to be invoked (used) rather than modified. In this mode of operation, all display objects (such as buttons) that can be used appear on the screen (or at least as many as the screen size allows), as shown in part in FIG. 6, and the system moves in a loop within this mode. In FIG. 6, icons 11, 12, 13 and 14, named respectively "Appointments", "Addresses", "Puzzle" and "Train Set" represent buttons for separately accessing databases, files, stacks, etc., of these names, and the triangle 16 and the two rectangular textual buttons 17 and 18 are each for causing the computer to perform a certain predefined task. Button Mode and Field Mode shown in FIG. 5 are two of the basic edit-only modes wherein specified functionalities are merely mentioned for editing but not used or invoked. There are other edit-only modes for carrying out various specific interface-modifying operations, but they are not included in FIG. 5 in order to simplify the explanation. The user, while in Browse Mode, can enter Button Mode for modifying attributes of a button, Field Mode for modifying attributes of a field (i.e., an area containing textual information) or any of the other edit-only modes, for example, by pressing a corresponding button. These attributes usually include such things as editing the name of the button or field, editing styles and/or fonts of the button or field name, editing the display image of the button or field (e.g., changing, moving, resizing, etc.), deleting the button or field, obtaining further information about the button or field, etc.

In this manner, HyperCard®, as in most prior art systems, allows display objects (such as buttons and menu items) to be directly manipulated in either of the two major modes, one associated with use and the other with mention. However, one major limitation of these prior art systems is that the user is required to decide in which of the modes these objects are to be manipulated. Thus, repeatedly crossing the modal barrier can become tedious when, for example, the user wants to modify an object and then try it out to see the result. These prior art systems require the user to continually remember what mode he/she is in. Although the graphical representation of the cursor may be changed from one mode to another, the user still tends to forget what mode he/she is in. If the user tries to use a button while in the mode for mentioning, for example, the computer will not respond with an execution of the predefined task, and the user may think that the button or system is broken.

One approach in the prior art to alleviate the user confusion created when a system is in the mention-only mode and the user merely wants to perform a use function is to essentially hobble the system, from the user perspective, so that the system is only allowed to operate in a use-only mode. In this way, the user need not worry about what mode the system is operating in because the system is functionally hobbled to be in only one mode, the use-only mode. Of course, this hobbling, by definition, eliminates even the possibility of mentioning or editing the display objects and as such is a more limited or restricted, albeit simplified, user interface system.

According to one of the prior art methods addressed to this problem (Randall B. Smith, David Ungar and Bay-Wei Chang: SIGCHI '91 Workshop on Computer Languages for Programming User Interface Software), special places or indicators ("affordances") are displayed on or adjacent buttons. Each affordance is associated with a different way in which the button can be modified. When the user wants to modify a button in a certain way by "mentioning" the button to the computer, a position indicator, such as a cursor or pointer, is moved on the display screen (say, by means of a mouse) to the particular affordance corresponding to the desired way of modifying the button. If an activation signal is sent to the computer (say, by clicking on the mouse) with the indicator pointing to the desired affordance, it is the affordance, and not the button itself, that is selected or "pressed." Thus, the computer does not perform the task associated with the button, but instead modifies the button by changing one of its attributes.

There are problems, however, with this prior art affordance display approach. On the one hand, because the affordances were always displayed in this prior art approach, and because the affordances must not be allowed to interfere with the use of the button, this required the affordances to be relatively small (which thus further limited the quantity and range of affordances as well as each affordances' ability to visually indicate or depict its functionality). On the other hand, the affordances could not be so small, nor the display of the affordances so cluttered, that they became difficult for the user to find or remember what each affordance does. In addition, there may be situations where it is not desirable to have additional areas reserved for the affordances at all such as, for example, for aesthetic reasons associated with reducing visual clutter or for ease of use reasons associated with making the computer user interface more simplified albeit more limited in capability. Without any hobbled use-only mode in this prior art affordance system, and without any ability to selectively display affordances on a button-by-button (object-by-object) basis, it was not possible to prevent display of all affordances nor to show a multiplicity of affordances, complex or otherwise. In summary, affordances, as hitherto considered, are awkward to use and lack the degree of functionality desired by the present system.

According to another prior art approach, a palette of various editing "tools" was provided for carrying out different modifying operations on buttons. This required the user to select one of these tools for each kind of operation to be carried out. Once selected, each of these tools was adapted to stick to the cursor and be moved around so that the user could then "place" the editing tool over the object to be edited and thereby perform the desired editing operation. This method was cumbersome because the user had to switch tools between every two editing operations that were to be performed and was less intuitive because there was less association between the editing tools and the object to be edited.

SUMMARY AND OBJECTS OF THE INVENTION

It is therefore an object of the present invention to provide a computer system with a direct manipulation interface, with which the user can easily go back and forth between using the computer and modifying the various attributes of pictorial and textual images, which images are displayed on the screen to be manipulated directly by the user in order to cause the computer to perform corresponding tasks.

A computer system embodying the present invention, with which the above and other objects can be accomplished, may be characterized not only as having a display screen and a pointer-controlling means such as a mouse, but also as being programmed so as to be operable in a so-called edit-and-use mode, which combines both the conventional use-only and mention-only modes, in addition to a conventional hobbled use-only mode. In one embodiment, when the user enters the edit-and-use mode, a select box may be caused to appear on (or adjacent) each display object, such as a button, which button can be selected to cause the computer to perform a certain predefined task. If the user selects such a select box, a group of edit handles (affordances) appears on the screen, each representing a particular manner in which the display object associated with the selected select box can be modified. In the meantime, however, this associated display object is not disabled; that is, if the user selects the display object at this stage of the process, the computer can still perform the task associated with it. If the user selects one of the edit handles instead, the computer serves to modify an attribute of the associated display object in the way specified by the selected edit handle.

According to an alternative embodiment of the invention, the computer may be programmed such that only the pictorial symbols representing the display objects appear initially without any select boxes, and the user causes the edit handles to appear by directing the pointing device at the selected display object and either moving it in a specified manner without clicking it, or signaling via other means such as a keyboard command.

In summary, the present invention allows the user to go back and forth between using and mentioning the display objects appearing on the screen without having to remember in the meantime which mode he/she is in, and the user can always use a display object shown on the screen, whether or not edit handles (affordances) are also being shown at the same time.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE INVENTION

The invention will be described below by way of a preferred embodiment as an improvement over the aforementioned HyperCard® program, and implemented on an Apple Macintosh® (trademark of Apple Computer, Inc.) computer system including a display screen and a mouse. It is to be noted, however, that this invention can be implemented on other types of computers and/or by using other types of pointer-controlling means such as a light pen, trackball, tablet, touch sensitive display screen, etc. Since such pointer-controlling means are well known, their functions and methods of operation will not be described in any detail herein.

Figure 4:
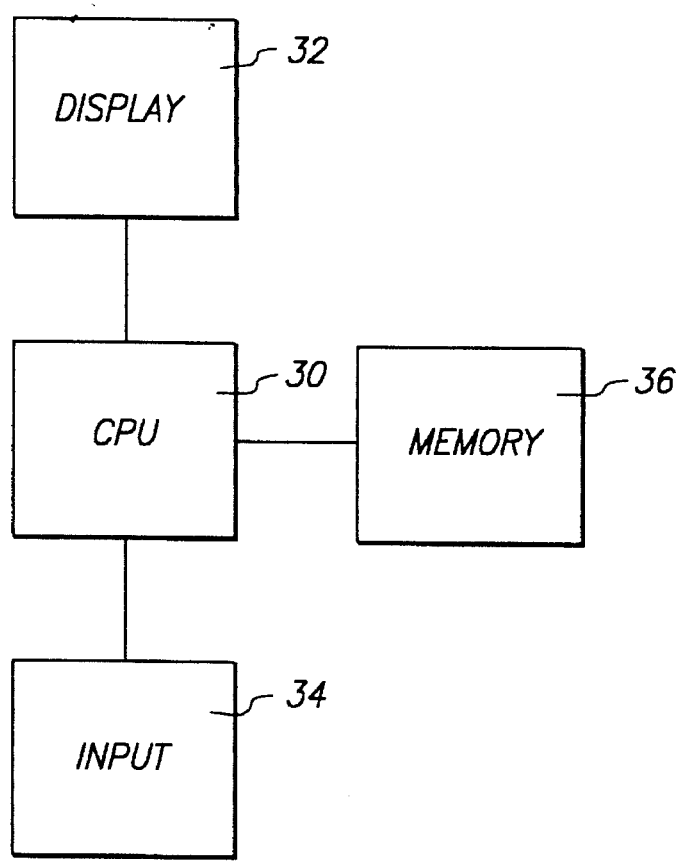
FIG. 4 is a block diagram of a computer system for using a direct manipulation computer user interface of the present invention.

Furthermore, the present invention can be implemented on all kinds of computer systems. Regardless of the manner in which the present invention is implemented, the basic operation of a computer system embodying the present invention, including the software and electronics which allow it to be performed, can be described with reference to the block diagram of FIG. 4, wherein numeral 30 indicates a central processing unit (CPU) which controls the overall operations of the computer system, numeral 32 indicates a standard display device such as a CRT or LCD, numeral 34 indicates an input device which generally includes both a standard keyboard and a pointer-controlling device such as a mouse, and numeral 36 indicates a memory device which stores programs according to which the CPU 30 carries out various predefined tasks. The interface-modifying program according to the present invention, for example, is generally also stored in this memory 36 to be referenced by the CPU 30.

The solution to the aforementioned use-mention problem according to the present invention may be characterized by the use of a broad range of affordances that can be caused to appear or disappear from the screen (even object-by-object) through the introduction of a new mode of operation herein referred to as the edit-and-use mode, which is a fully functioning combination of the conventional use-only mode and the conventional mention-only mode. As shown schematically in FIG. 1 by way of a simplified event loop flowchart, the computer is also allowed to operate in a use-only mode of a conventional type explained above, and the user can switch from one to the other of these two modes of operation, say, by operating a mode-selecting switch (not shown) to thereby output a mode selecting signal to the computer. Such a mode-selection switch for going back and forth between the two modes shown in FIG. 1 may be an ever-present button, a menu item, or a physical button on the machine itself.

Figure 1:
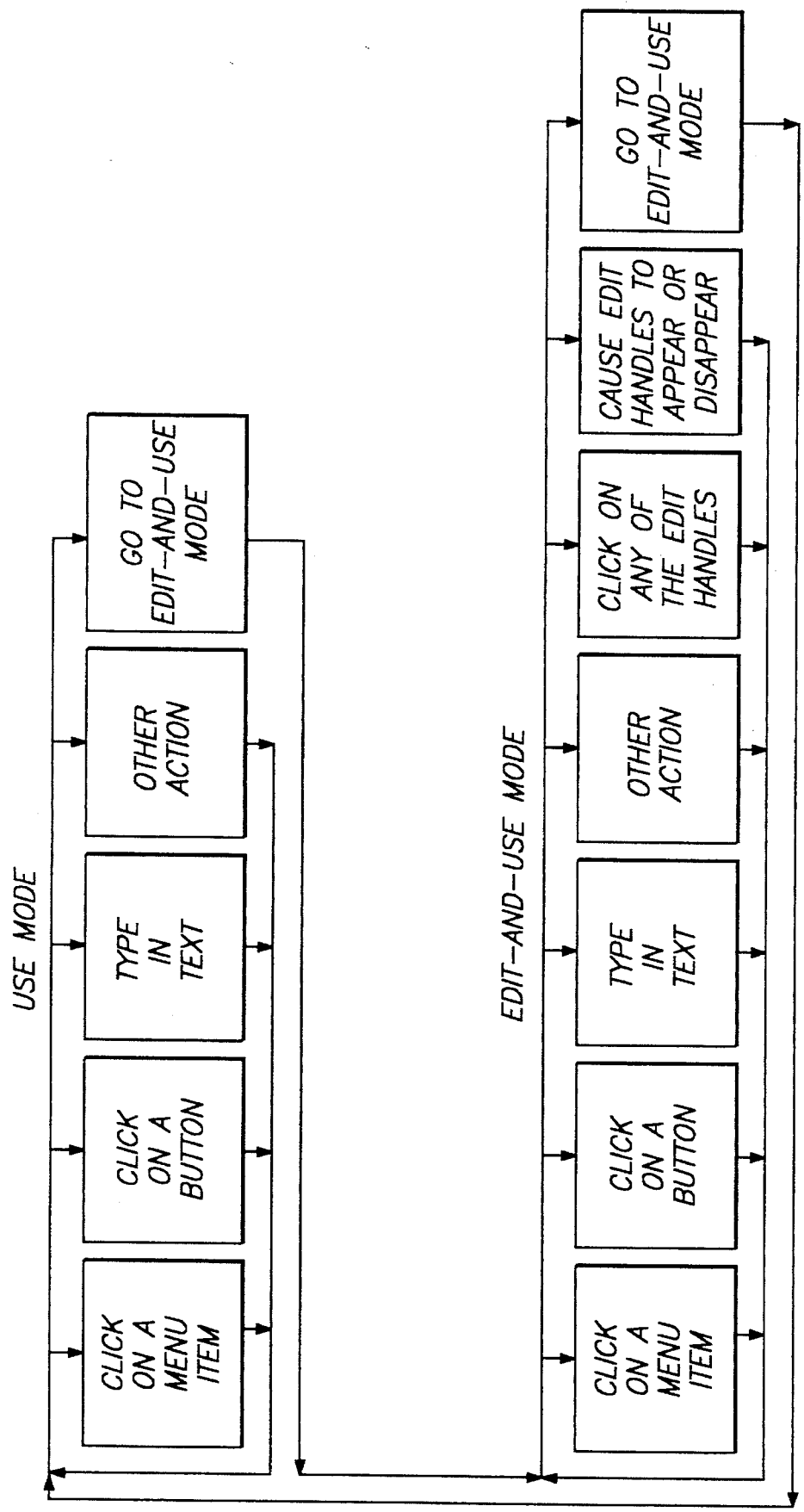
FIG. 1 is a simplified event loop flow chart for the operation of a computer user interface embodying the present invention.
Figure 2:
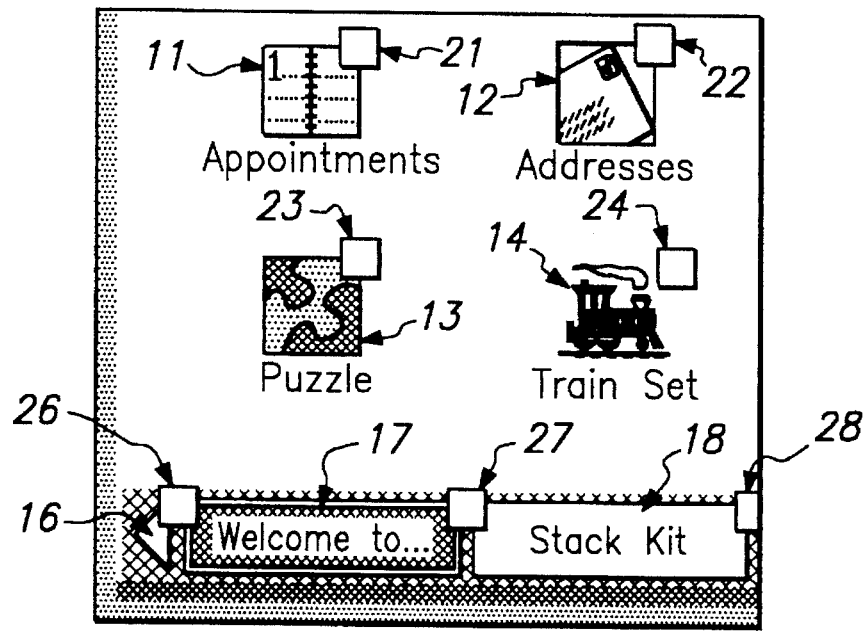
FIG. 2 is a left-hand bottom corner portion of the image displayed initially on the screen in the operation shown in FIG. 1 before any of the buttons thereon have been selected.
Figure 6:
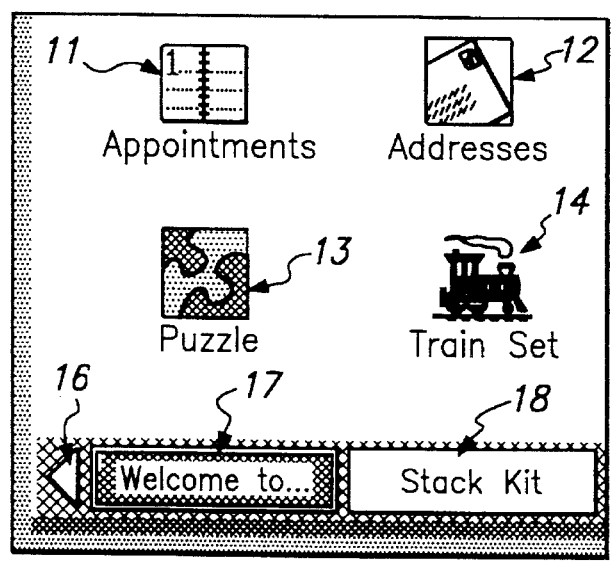
FIG. 6 is a left-hand bottom corner portion of the image displayed initially on the screen in Browse Mode (use mode) of operation shown in FIG. 5.

According to one embodiment of the invention, display objects including buttons and menu items appear on the screen as shown in FIG. 6 while the computer is in the use-only mode, and as shown in FIG. 2, as the system enters the edit-and-use mode from the use-only mode. It is to be noted in FIG. 1, that the user can do everything within the use-only mode that could be done within the Browse Mode shown in FIG. 5. It is also to be noted that the display shown in FIG. 2 is nearly identical to the screen image shown in FIG. 6 except small boxes (hereinafter referred to as "select boxes") 21, 22, 23, 24, 26, 27 and 28 also appear, each corresponding to one of the icons and other elements which are the same as those appearing in FIG. 6. Each of these select boxes appears adjacent to (and as if being superimposed upon) the corresponding one of the buttons 11–14 and 16–18. It is additionally to be noted that the select boxes are small enough not to waste the precious screen real estate or to obstruct the view of the associated icons or other symbols, while large enough for the user to easily bring a pointer onto them.

Figure 5:
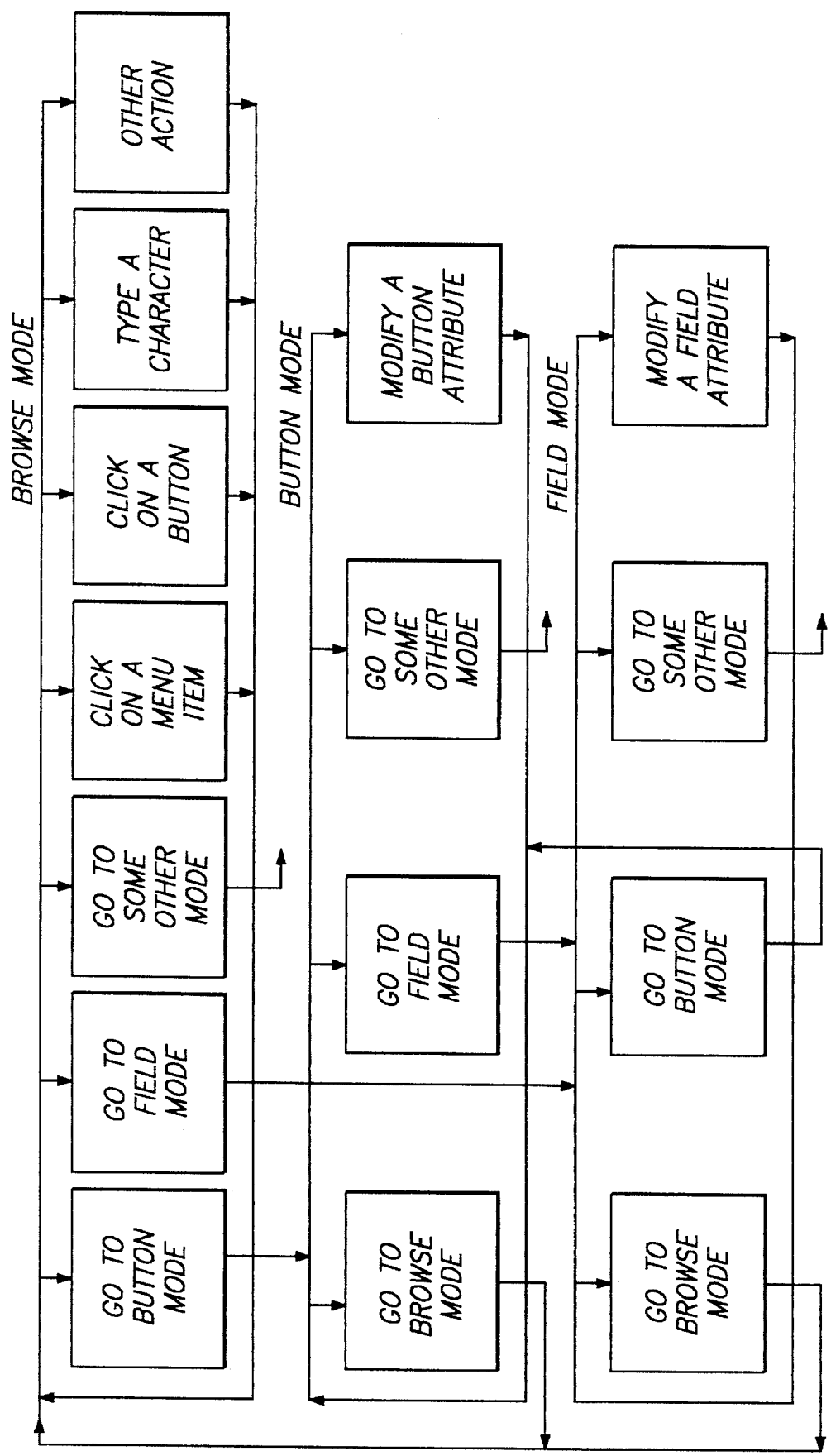
FIG. 5 is a simplified event loop flow chart for operating prior art HyperCard® with edit modes in addition to a use mode.

Appearance of the select boxes, however, does not mean that the user must necessarily select one of them in the next step, or as soon as the edit-and-use mode is entered, because the display objects, which are shown on the screen, are not only reachable/selectable but also functional. As can be understood by comparing the first and second rows of FIG. 1, what the user can do with the display objects in the use-only mode can also be done in the edit-and-use mode, such as clicking on one of the buttons. Referring again to FIG. 2, when in the edit-and-use mode, if the user selects one of the displayed buttons by moving the pointer (not shown) to the corresponding icon (such as indicated by numeral 11) and then clicks on the mouse to thereby output a task-performing signal to the computer, the computer responds in the same way as in the use-only mode of FIG. 6 (or Browse Mode shown in FIG. 5). While using one of such display objects such as a button, the user may be able to type characters in (e.g., to input text to a database field), again as was the case in Browse Mode. What is referred to as a "menu item" in FIGS. 1 and 5 is like a button and is still another kind of "object," although not shown in FIG. 2 or 6. If the user moves the cursor to one of such menu items and clicks on the mouse button, the computer will likewise respond in the same way as in Browse Mode explained above with reference to FIG. 5.

Figure 3:
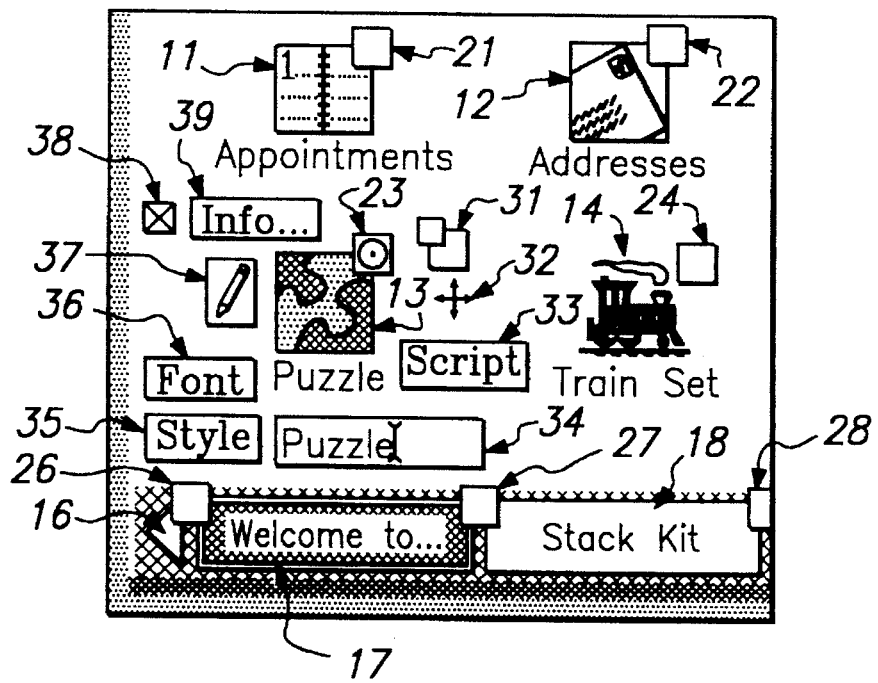
FIG. 3 is the same portion of the displayed image as in FIG. 2 after one of the buttons has been selected to cause edit handles to appear.

If the user wants to mention one of the objects displayed on the screen as shown in FIG. 2, say, in order to modify its attributes, but without using it, this can be done only in the edit-and-use mode, not in the use-only mode. In the preferred embodiment of the present invention, to mention an object, the mouse is clicked while the pointer is inside (or on top of) the select box corresponding to the object to be edited. If the user wants to modify one or more of the attributes of the button named "Puzzle", for example, the mouse is clicked inside the select box 23 corresponding to and appearing on the icon 13 indicative of this button. If this is done, a halo of affordances 31–39 (herein referred to as "edit handles") appear as shown in FIG. 3, surrounding the icon 13 of the selected button (i.e., the one named "Puzzle"), each edit handle itself functioning as an action-calling area as each button functions as a task-calling area. In the next step, the user can click or drag on an edit handle to thereby output an appropriate editing signal so as to edit the object in different ways. In the example shown in FIG. 3, the user can make the button larger or smaller by using the edit handle at 31. The other edit handles 32–39 allow the user to, respectively, control the position of the button, see its script (the program code that determines what the "task" that's called is), edit the recorded name of the button, edit styles and/or fonts of the button name, edit the display image of the button (e.g., changing, moving, resizing, etc.), delete the button, and obtain further information about the button. Of course, other tasks could likewise be supported by the present invention.

As should be clear from FIG. 1, these editing operations described above can be carried out only while the computer is in the edit-and-use mode. They cannot be done in the use-only mode because the computer is not programmed to respond to any of the editing signals while in the use-only mode. Note that the user will not find it cumbersome to have this distinction between the modes because edit handles are needed for editing operations and when these edit handles are not being shown, the user would not try to select an edit operation based on an edit handle not shown, and the computer is not in the mode (edit-and-use) for allowing such operations anyway. Once in the edit-and-use mode, the user can easily go back and forth between using and editing any of the display objects such as a button because they are all accomplished within the same mode. It is again to be noted that appearance of edit handles on the screen does not mean that the user must necessarily select one of them in the next step. The user can ignore the displayed handles and select any of the objects displayed on the screen, whether or not associated with the displayed edit handles. The user can even select the select box of another button such that more than one of the buttons on the screen can have a halo of edit handles displayed at the same time. In this way, edit handles can be made to appear button-by-button or object-by-object. This allows user control of display of a multiplicity of affordances yet still avoids the visual clutter problem of the prior art.

In order to cause the edit handles to go away so that, for example, the display objects on the screen will be less obstructed and hence can be seen more clearly, the user need not necessarily leave the edit-and-use mode by going into the use-only mode, although this is certainly one way of doing so. The user can stay in the edit-and-use mode while causing currently displayed edit handles to disappear by outputting a handle-removing signal. This may be effected in any of many ways mentioned above, such as clicking on an ever-present button or a menu item (not shown).

The present invention has been described above by way of only one example, but it should be clear that this example is intended to be merely illustrative and not as defining the scope of the invention. With reference to FIG. 3, for example, the number of edit handles made to appear when one of the select boxes is selected need not always be the same for all select boxes. The kinds of editing to be made allowable by using edit handles need not be the same as illustrated above with reference to FIG. 3, or for all select boxes or display objects. Although the use of a mouse was assumed above as a pointer-controlling device, other types of such means such as light pens, roller ball control systems, tablets, touch sensitive display screens, etc., may be substituted.

More importantly, no particular manner in which the user causes the edit handles to appear around any of the display objects on the screen is intended to limit the scope of the invention. In order to cause the edit handles to appear, the user can cause a handle-generating signal to be emitted in any other specified manner. According to an alternative embodiment of the invention, the computer may be programmed such that only the pictorial task symbols representing the display objects appear initially without any select boxes, for example, as shown in FIG. 6, and the user causes the edit handles to appear by merely directing the pointer of the pointing device at the selected display object (known as a "mouseover" in the art), or by directing the pointer at the selected display object and moving it in a specified manner, such as by wiggling without clicking it (known as "gesturing"), or by directing the pointer at the selected object and issuing a keyboard command. Similarly, the computer may be programmed such that a particular attribute of a selected button, for example, can be modified without necessarily clicking on the pointing device, because the user can transmit an editing signal from the pointing device to cause the computer to effect a desired attribute modification in any of other known methods such as by moving the pointing device in a circle, or wiggling it, or in any other specified manner, without clicking on it (all generally referred to as "gesturing").

In a still further embodiment of the present invention, the computer may be programmed such that only the pictorial task symbols representing the display objects appear initially without any select boxes, for example, as shown in FIG. 6, and the user causes a select box for a given display object to appear by merely directing the pointer at the desired display object. Once the select box has been made to appear, again by simply placing the pointer over the display object, the pointer can then be moved over the select box to then cause edit handles to appear for the desired display object. Once the edit handles appear, the user can then select any of them by moving the pointer over the desired edit handle and indicate its selection by any of the known methods as described above, or even by the mouseover action itself. Note that this embodiment also supports object-by-object select box and edit handle display because moving the pointer away from the display object which is currently displaying a select box and/or edit handles to a display object which is not currently displaying a select box and/or edit handles, typically causes the select box and/or edit handles to disappear from the first display object and appear on the second display object.

In a further embodiment still, display objects display select boxes and/or edit handles (thus supporting edit functions) according to which portion of the display screen area the display objects are currently displayed in. In other words, one portion of the display screen may support object display in a use-only mode, while another portion of the display screen may support object display either in a use-only mode or in an edit-and-use mode. Still further, one portion of the display screen may support object-by-object display of select boxes and/or edit handles, while another portion of the display screen may support display of select box and/or edit handles across all objects in that portion. These separate portions may be defined by physical location on the display screen, by separate windows displayed on the display screen, or by any other division of display screen space known in the art.

In summary, the present invention frees the user from the requirement of remembering which mode he/she is in while going back and forth between using and mentioning the buttons appearing on the screen, and this is accomplished without the aid of sometimes obtrusive or limited affordances of prior art kinds. The description of the invention given above is intended to be interpreted broadly. Such modifications and variations of the embodiments of the present invention described above, that may be apparent to a person skilled in the art, are intended to be included within the scope of this invention.

What is claimed is:

1. A computer system with direct manipulation interface, comprising:

a display screen;

a pointing means capable of indicating a position on said display screen;

image-producing means for displaying an image on said display screen, said image including one or more task-calling areas, each of said task-calling areas being individually selectable and each of said task-calling areas being associated with a predefined task to be performed by said computer system;

handle-generating means for generating one or more handle areas associated with and proximal to at least one said task-calling area on said display screen if a handle-generating signal associated with said task-calling area is generated, each of said handle areas corresponding to an interface-modifying operation to be performed by said computer system on said task-calling area, said handle areas being removable in response to a handle-removing signal;

editing means for causing said computer system to respond, if any one of said handle areas is selected, by effecting the task-calling area interface-modifying operation corresponding to said selected handle area; and task-performing means for causing said computer system to respond, if any one of said task-calling areas is selected, by performing the predefined task associated with said selected task-calling area, when said handle areas are currently being displayed on said display screen.

2. A computer system of claim 1 wherein said task-calling areas are selectable by said pointing means.

3. A computer system of claim 2 wherein, if said handle area is selected, said handle area is selected by said pointing means.

4. A computer system of claim 3 wherein said handle-generating signal is generated by said pointing means.

5. A computer system of claim 4 wherein said handle-removing signal is generated by said pointing means.

6. The computer system of claim 1 further comprising: a mode-selecting means for causing at least one portion of said display screen to operate selectably in a first mode or in a second mode, wherein said handle-generating means and said editing means are operational in said first mode but not in said second mode.

7. The computer system of claim 6 wherein said image-producing means causes handle symbols to be displayed at said handle areas, each of said handle symbols being representational of the interface-modifying operation corresponding to said handle area.

8. The computer system of claim 7 wherein said image-producing means causes task symbols to be displayed at said task-calling areas, each of said task symbols being representational of the task associated with the task-calling area.

9. The computer system of claim 8 wherein said image also includes one or more select boxes, each of said select boxes being paired with one of said task-calling areas, and wherein said pointing means generates said handle-generating signal associated with any one of said task-calling areas if said pointing device selects said select box paired with said any one of said task-calling areas.

10. The computer system of claim 9 wherein said pointing means is a mouse.

11. A method of operating a computer system having a display screen and a pointing device capable of indicating a position on said screen, said method comprising the steps of:

displaying an image on said display screen, said image including one or more task-calling areas, each of said task-calling areas being individually selectable and each of said task-calling areas being associated with a predefined task to be performed by said computer system;

generating one or more handle areas associated with and proximal to at least one said task-calling area on said display screen if a handle-generating signal associated with said task-calling area is generated, each of said handle areas corresponding to an interface-modifying operation to be performed by said computer system on said task-calling area, said handle areas being removable in response to a handle-removing signal;

causing said computer system to respond, if any one of said handle areas is selected, by effecting the task-calling area interface-modifying operation corresponding to said selected handle area; and causing said computer system to respond, if any one of said task-calling areas is selected, by performing the predefined task associated with said selected task-calling area, when said handle areas are currently being displayed on said display screen.

12. The method of claim 11 wherein said task-calling areas are selectable by said pointing means.

13. The method of claim 12 wherein, if said handle area is selected, said handle area is selected by said pointing means.

14. The method of claim 13 wherein said handle-generating signal is generated by said pointing means.

15. The method of claim 14 wherein said handle-removing signal is generated by said pointing means.

16. The method of claim 11 further comprising the step of:

causing at least one portion of said display screen to operate selectably in a first mode or in a second mode, wherein said handle-generating means and said editing means are operational in said first mode but not in said second mode.

17. The method of claim 16 wherein handle symbols are displayed at said handle areas, each of said handle symbols being representational of the interface-modifying operation corresponding to said handle area.

18. The method of claim 17 wherein task symbols are displayed at said task-calling areas, each of said task symbols being representational of the task associated with the task-calling area.

19. The method of claim 18 wherein said image also includes one or more select boxes, each of said select boxes being paired with one of said task-calling areas, and wherein said pointing means generates said handle-generating signal associated with any one of said task-calling areas if said pointing device selects said select box paired with said any one of said task-calling areas.

20. The method of claim 19 wherein said pointing means is a mouse.

* * * * *